July 10, 1951  B. SCHROETER  2,560,134
SELF-LUBRICATING BEARING
Filed Nov. 1, 1946
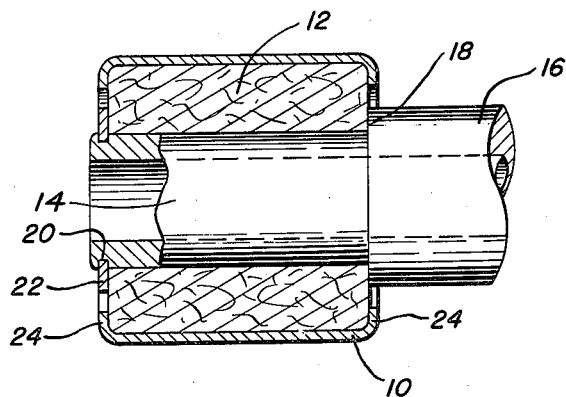
INVENTOR.
BRUNO SCHROETER.
BY
ATTORNEYS.

Patented July 10, 1951

2,560,134

UNITED STATES PATENT OFFICE 2,560,134

SELF-LUBRICATING BEARING

Bruno Schroeter, Detroit, Mich., assignor to O. & S. Bearing Company, Detroit, Mich., a corporation of Michigan Application November 1, 1946, Serial No. 707,090

2 Claims. (Cl. 29—149.5)

This invention relates to a self-lubricating bearing and particularly to a bearing of the class used for oscillating motion and commonly applied on vehicle chassis at points such as spring shackles, shock absorber links, brake rod cross shafts, etc. Such bearings comprise a sleeve of fibrous material such as cotton or asbestos wicking which is impregnated with a lubricant and compressed in place between the journal and the bearing support.

It is an object of the present invention to provide an improved construction of this character having a long life and capable of carrying greater loads and operating at larger angles of oscillation than previous constructions.

It is also an object to provide a bearing of this class in which the bearing material is pre-compressed to its final form and size so that the material does not change its size or shape at the bearing surface whether under no load or full load.

The single figure represents a longitudinal section of a bearing incorporating a preferred form of the present invention.

In the form illustrated, the bearing comprises a metal tube 10 forming a bearing support and a bearing member 12 in which a journal 14 is rotatably mounted. The journal 14 may be formed as part of an oscillatible shaft 16. The entire assembly is adapted to be pressed in place in a suitable bore whereby the sleeve 10 will be rigidly supported against rotation or endwise movement. The shaft 16 has a shoulder 18 against which one end face of the bearing 12 abuts and is provided also with a groove 20 carrying a snap ring 22 forming a shoulder for the opposite end of the bearing material 12. The supporting sleeve 10 is crimped inwardly at its ends as indicated at 24 for the purpose of tightly securing the bearing sleeve 12 in the supporting sleeve 10 against end-wise displacement.

The bearing sleeve 12 is of the same general class of materials as are disclosed in the patent to Delp, No. 2,379,478, in that it comprises a fibrous material such as woven cotton or asbestos impregnated with a lubricant. It is preferred to use a lubricant compound having a low breakaway friction such as the fatty acid materials more fully described in the aforesaid Delp patent although other lubricants or additional binding agents may be also used.

In distinction to the bearings of this class previously known, the present bearing sleeve is not under compressive stress exerted by the surface of the journal 14 on the sleeve 12 when the bearing is not subjected to load. For this purpose the impregnated fibrous material is so formed and processed as to give it a high degree of hardness, particularly on its inner surface, and this treatment provides a bore which retains its size and shape so that the journal may be inserted in the bore freely after the sleeve 12 is formed. This result may be achieved in various ways, for example, by laying in a quantity of fibrous material on the interior of the supporting sleeve 10 before it is crimped and by inserting a mandrel inside the fibrous material of slightly larger diameter than the final finished bore. The assembly is then placed in a die and subjected to axial compression so that the final volume of fibrous material is in the neighborhood of 65 per cent of its original volume. It has been found that by compressing the material axially instead of radially and exerting a higher compression than previously used, the finished bearing sleeve has only a very small residual expansion when the mandrel is removed and that the inner surface retains its size and shape very accurately. Thus, the inner or bearing surface of the sleeve 12 is relatively hard and rigid and has a permanent size and shape.

It will be seen that the end shoulders 18 and 22 on the shaft journal bear against the end face of the inner portion of the sleeve 12. These end faces are likewise hard and highly compacted. Consequently, all of the rubbing or bearing surfaces between the sleeve 12 and the journal 14 are free running with a very low friction while, at the same time, they are backed up by the outer zone of fibrous material. In this way, there is provided a bearing which retains its size and shape both under load and when unloaded and the journal may be freely inserted therein after formation of the bearings. Thus, the inner journal may be integral with the main member with which it is associated and does not require the use of separate inner liners which must be placed within the bearing sleeve at the time of manufacture.

I claim:

1. A method of making a self-lubricating bearing which comprises forming a cylindrical shape of woven fibrous bearing material impregnated with a lubricant, inserting a sized mandrel inside the cylindrical fibrous material of slightly larger diameter than the final finished bore, confining the outer surfaces of said cylindrical material and subjecting the ends to a force whereby the entire mass of fibrous material is materially compressed axially, and subsequently confining a portion of the ends of the material adjacent the outer confining means to form a finished bearing having an inner bearing surface relatively permanent in size and shape.

2. A method of making a self-lubricating bearing as defined in claim 1 in which the axial compression is of sufficient force to reduce the fibrous material to approximately 65 per cent of its original volume.

BRUNO SCHROETER.

REFERENCES CITED

The following references are of record in the file of this patent:

UNITED STATES PATENTS

| Number | Name | Date |
| --- | --- | --- |
| 1,141,974 | Skillman | June 8, 1915 |
| 1,620,530 | Field | Mar. 8, 1927 |
| 1,745,704 | Muncy | Feb. 4, 1930 |
| 1,936,863 | Skillman | Nov. 28, 1933 |

FOREIGN PATENTS

| Number | Country | Date |
| --- | --- | --- |
| 494,544 | France | Sept. 11, 1919 |